June 1, 1943.   L. W. LESSLER   2,320,441
FILM MOVING AND COUNTER MECHANISM
Filed July 31, 1940    3 Sheets-Sheet 1

INVENTOR.
LEW W. LESSLER
BY
ATTORNEYS

June 1, 1943.  L. W. LESSLER  2,320,441
FILM MOVING AND COUNTER MECHANISM
Filed July 31, 1940    3 Sheets-Sheet 2

LEW W. LESSLER
INVENTOR.
BY
ATTORNEYS

June 1, 1943.  L. W. LESSLER  2,320,441
FILM MOVING AND COUNTER MECHANISM
Filed July 31, 1940  3 Sheets-Sheet 3
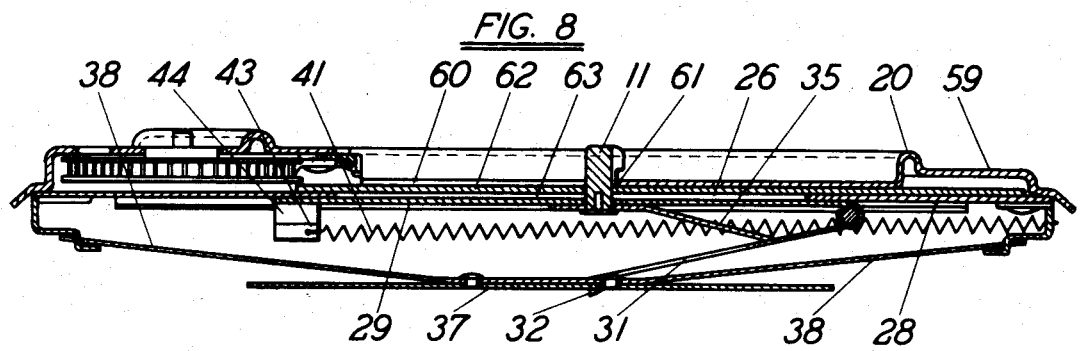
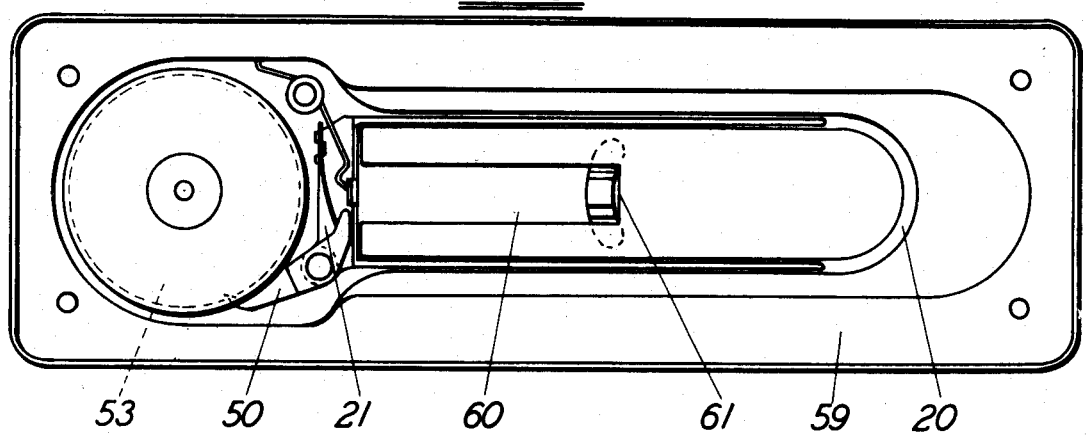
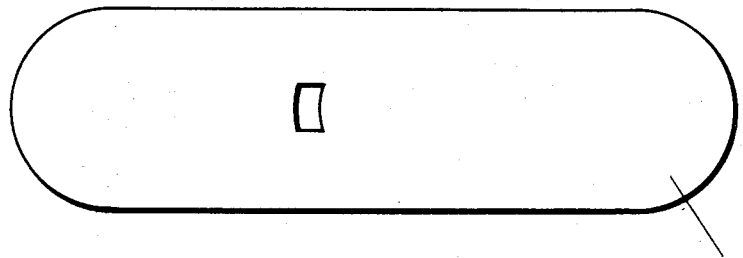
LEW W. LESSLER
INVENTOR
BY
ATTORNEYS Patented June 1, 1943

2,320,441

UNITED STATES PATENT OFFICE 2,320,441

FILM MOVING AND COUNTER MECHANISM

Lew W. Lessler, Binghamton, N. Y., assignor to General Aniline & Film Corporation, Binghamton, N. Y., a corporation of Delaware Application July 31, 1940, Serial No. 348,744

2 Claims. (Cl. 95—31)

The present invention relates to roll film cameras in general, and more particularly to a novel film moving and counter mechanism for such a camera.

Various mechanisms have been developed in the prior art for transporting the light-sensitive film by a reciprocating movement, as contrasted with the usual rotary winding devices. Such a reciprocating mechanism is shown, for example, in U. S. Patent 1,740,279, issued to C. A. Bornmann.

In these prior art devices, it was impossible to obtain an effective operating stroke of greater length than one-third of the available spacing within the camera. Similarly, a film moving mechanism of this type could be constructed for a single specified length of stroke and could not readily be modified to permit the feeding of a different length of film per stroke.

With these limitations of the prior art in view, it is accordingly one object of the present invention to provide a film feeding mechanism of the reciprocating slide type in which a relatively long stroke with respect to the dimensions of the camera casing is made possible.

Another object of the invention is the provision of a film moving mechanism which can be readily modified for feeding a different amount of film per stroke.

A further object is to provide a novel combination film feeding and counter mechanism which is adaptable for the taking of a different number of pictures on a given length of film.

Additional objects and advantages of the present invention will be readily apparent from the following specification.

In the attached drawings, which form a part of this application and in which like reference characters indicate like parts:

Figure 8 is a sectional view similar to that of Figure 3, but with the mechanism modified for the feeding of a smaller amount of film per stroke;

Figure 9 is a view (corresponding to that of Figure 4) of the supporting plate and counter actuating mechanism of Figure 8; and Figure 10 is an enlarged view of a light-excluding plate for use in the device of Figure 8.

In order that those persons skilled in the art may fully understand the nature and scope of this invention, the following detailed description will now be given, with specific reference to the drawings forming a part of this application.

Figure 1:
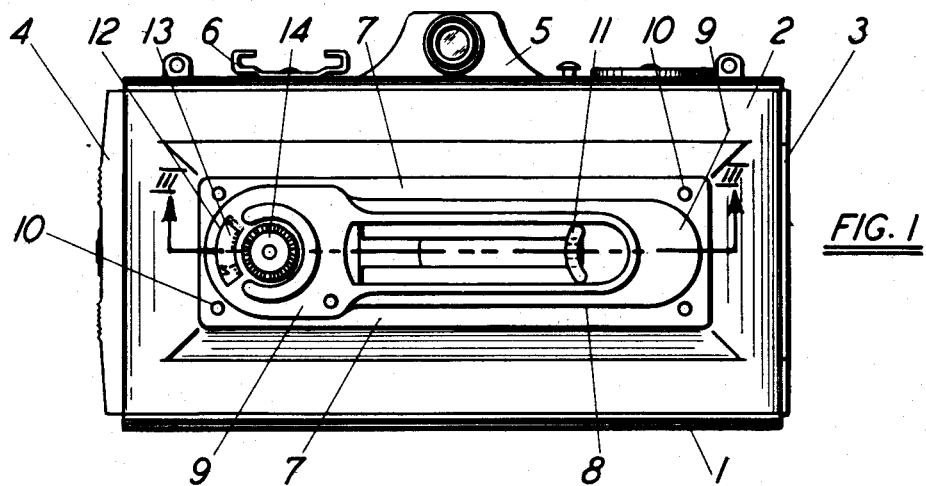
Figure 1 is a rear view of a camera provided with one form of feeding and counter mechanism according to the present invention.

Figure 1 shows a rear view of a camera 1 provided with the usual camera back 2 hinged to the rest of the body at 3. A catch 4 is provided for retaining the back in its closed position with respect to the camera. A view finder 5 and an accessory clip 6 may be positioned on the top of the camera body in known manner.

The back of the camera is provided with a protruding or raised portion 7 within which the film feeding and counter mechanism is mounted. This projecting portion is provided with a cut-out area at 8 through which a portion 9 of the feeding mechanism protrudes. The supporting plate for this feeding mechanism is fastened within the camera back by screws 10 or other desired means.

The projecting portion 9 of the supporting plate is also provided with an opening 12 through which a numbered dial 13 is visible as an indication of the number of film feeding movements which have taken place. A knurled wheel 14 is also provided for setting the dial after a new roll of film has been inserted in the camera.

Figure 2:
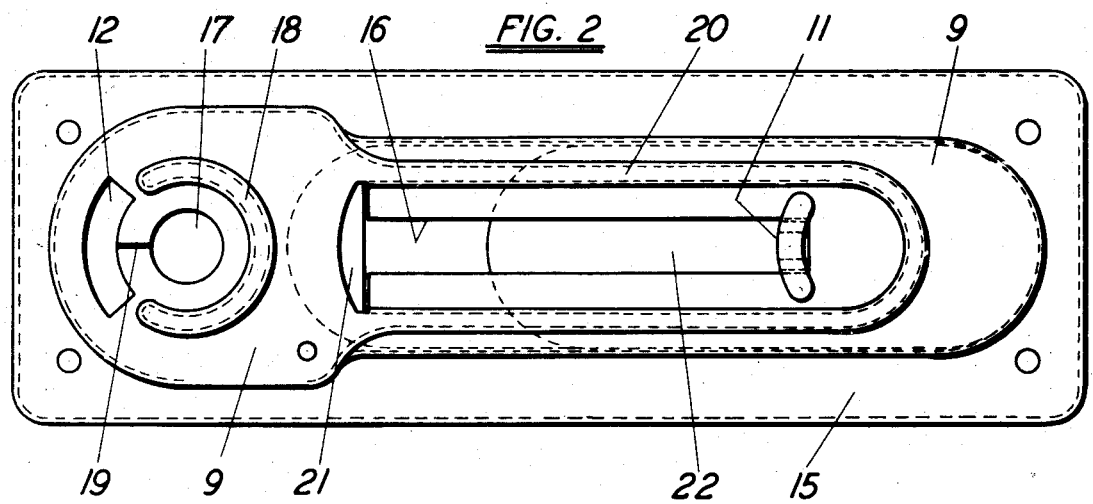
Figure 2 is an enlarged view of the film shifting mechanism itself, taken from the rear.
Figure 3:
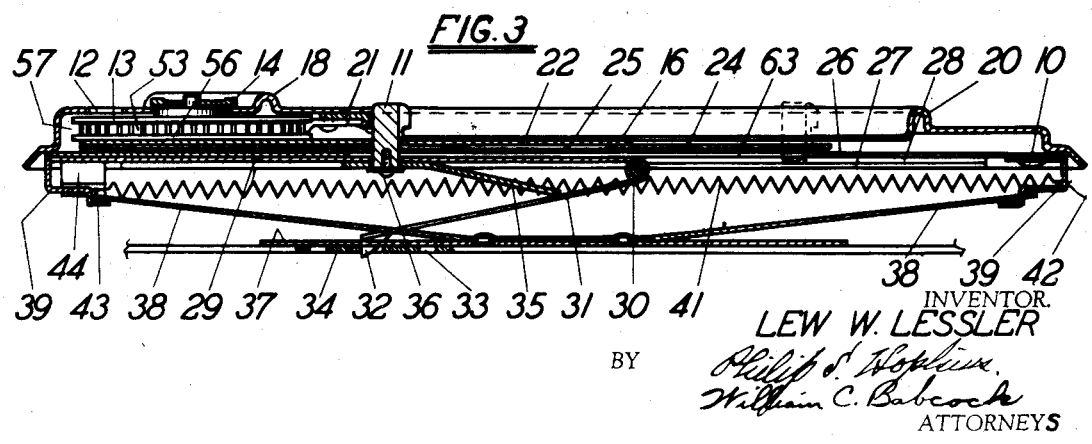
Figure 3 is a sectional view of the mechanism of Figure 1, taken along the lines III—III of said figure.

With reference to Figures 2 and 3, it will be apparent that the raised portion 9 is an integral part of the supporting plate 15 which is to be fastened within the camera back, as stated above. This plate 15 is provided with a longitudinal slot 16 through which an operating member 11 projects for actuation of the mechanism. Member 11 is slidable in said slot, from the starting position shown in Figure 2 to the final position shown in Figure 3. The raised portion 9 of this supporting plate 15 is also provided with an opening 17 through which the axle for the counting dial extends. Around this opening 17 is an embossed or raised portion 18 which protects the knurled wheel 14 from accidental operation—for example by catching on the clothing or some other object. An indicating mark 19 is positioned adjacent the opening 12 for cooperation with the numbered dial 13.

Around the edges of the slot 16 there is an additional raised or embossed groove 20, the purpose of which will be explained below. Finally, there is a counter actuating slide 21 positioned at the end of slot 16, which is engaged by the operating member 11 to actuate the counter at the end of the film feeding stroke.

Figure 7:
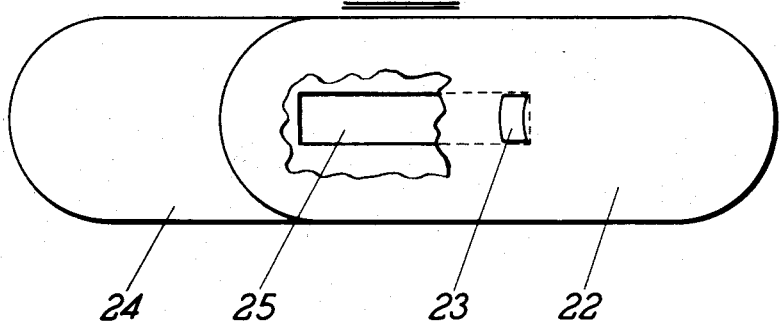
Figure 7 is an enlarged view of the improved light-excluding means cooperating with the film feeding mechanism.

As shown in Figure 3, the operating member 11 cooperates with light-excluding cover plates 22 and 24 for preventing the penetration of light through the slot 16 in supporting plate 15. There are two of these cover plates which are shown in greater detail in Figure 7. The upper plate 22 is provided with a single opening 23 which fits tightly around the operating member 11. Thus, the plate 22 will be carried along with said operating member throughout all portions of the latter's stroke. The lower plate 24 is provided with a longitudinal opening 25 through which member 11 extends. This opening permits limited relative movement of the operating member and upper plate with respect to this lower plate.

It will be apparent that the lower plate 24 masks the end portions of the slot 16, and is moved by member 11 only at the end portions of the stroke of said member. Thus, when member 11 is in the position shown in Figure 3 in heavy lines, the slide or plate 24 will have been carried to the left as shown, so that the other end of said plate (at the right of the figure) effectively seals that portion of the slot 16 opposite the position of the operating member. At the same time, the upper plate 22 has also been carried to the left and serves to exclude light from the remaining portions of slot 16 and from the longitudinal opening 25 in the lower plate. When the operating member is returned to its starting or dotted line position (Figure 3), the plates will assume a corresponding position at the right of the space in which they are free to move, so that the lower plate 24 will seal the left hand portion of slot 16 while the upper plate 22 will seal the right hand portion of said slot as well as the opening 25 in the lower plate.

It will be apparent that this double cover plate arrangement makes possible a much longer operating stroke for a given size of casing than was possible according to any known prior art methods. Formerly a single cover plate had been used to seal the slot in devices of this type. Such a plate is shown as 62 in Figure 10. With this single plate the length of the operating stroke could never be greater than one third of the total distance available for movement of the cover plate itself. Thus, the plate must be at least twice as long as the slot, in order to effectively close said slot when the operating member is at either end thereof. To permit the operating member to move to the end of the slot, it was accordingly necessary for the casing to extend a distance beyond the slot, equal to the slot length. The impossibility of obtaining a stroke greater than one third the length of the space available for movement of the cover plate, has seriously retarded the development of this reciprocating type of film winding mechanism.

According to the present invention, however, it will be seen that the double slide arrangement permits a length of stroke considerably greater than the customary travel. The lower plate 24 is not carried along by the operating member 11 at all portions of the latter's stroke, and thus the space required at each end of the slot 16 is proportionally much less than that previously needed for movement of the cover plate. The additional top plate 22 cooperates with said lower plate and with the operating member to seal the longitudinal opening 25 and thus make effective the use of the relatively movable lower plate and operating member.

The cover plates 22, 24 are retained in position against the supporting plate 15 by a bed plate 26. This bed plate is fastened to the supporting plate 15 and to the camera back itself by the screws 10 cooperating with brackets 39 on the inside of the camera back and bed plate. This bed plate 26 is provided at its lateral edges with longitudinal inturned flanges 27 which form channels 28 for supporting the reciprocating film moving slide 29. This slide 29 is directly connected to the operating member 11 by means of a screw 36, as shown in Figure 3. Thus, the slide moves longitudinally of the camera back under the control of said operating member. A film feeding arm 31 is pivoted to the slide 29 at 30 and is provided with claws 32 for engaging the perforations 33 in a film 34. These claws 32 are shaped so that they penetrate the perforation and carry the film along when the slide is moved in one direction (i. e., to the left in Figure 3), and at the same time can slide freely over the film without moving it when the slide is moved in the opposite direction.

A leaf spring 35 is provided to urge the arm 31 and claws 32 into engagement with the film. This spring 35 may be held by the screw 36 which fastens the reciprocating slide 29 and operating member 11 to each other. The customary presser plate 37 is mounted on spring arms 38 which, in turn, are carried by the brackets 39. These brackets 39 are fastened to the bed plate 26, supporting plate 15, and camera back 2, by screws 10 previously mentioned.

In order to return the slide 29 to its starting position after a film feeding movement has taken place, a return spring 41 is fastened to one of the brackets 39 at 42, and to a flange 44 on said slide 29 as at 43. A pair of such springs may be used, if preferred. Thus the operating member 11 may be moved by the fingers to feed the film against the tension of this spring 41 and will automatically return to its starting position when the operating member is released.

Figure 4:
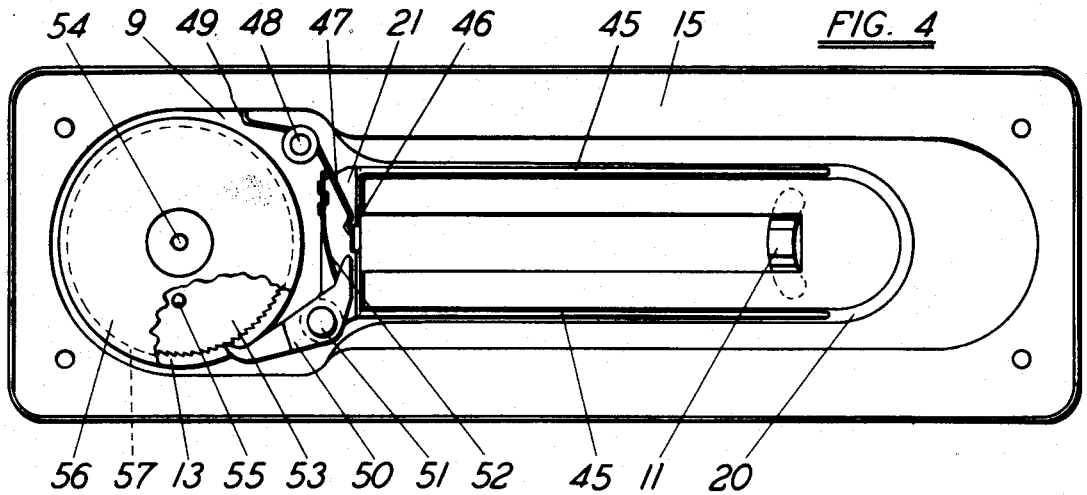
Figure 4 is a view of the supporting plate for the film feeding mechanism, taken from the interior of the camera and showing the counter mechanism according to the invention.

Combined with the film feeding mechanism described above, I have provided a cooperating counter mechanism, which will now be described. A counter-actuating slide 21 is positioned adjacent the plate 15 for engagement by the operating member 11 at the end of the feeding stroke of said member. This slide 21 is provided with longitudinal projections 45 which are guided and carried within the parallel longitudinal raised portions 20, mentioned above. This slide 21 is engaged at 46 by one end of a spring 47 which tends to urge said slide to the right in Figure 4. This spring is carried by a stud 48, and the other end of the spring engages the edge of the raised portion 9 of the supporting plate 15.

A pawl member 50 is pivoted to the slide 21 at 51 and is urged in a clockwise direction by the spring 52 fastened to said slide. This pawl is urged by said spring into engagement with a ratchet wheel 53 pivoted to the plate 15 at 54. This ratchet wheel is fastened to the underside of the counter dial 13 and rotates said dial by reason of the pin connection 55. A circular disk 56 is placed on the inner side of said ratchet 53. This inner disk 56 and the counter dial 13 extend slightly beyond the ratchet disk itself and thus form a channel 57 (best shown in Figure 3), within which the tip of the pawl 50 is guided.

It will be apparent from the foregoing description and drawings that the operating member 11 engages the slide 21 at the end of its stroke and moves said slide to the left (with reference to Figure 4) against the action of spring 47. As the slide 21 moves to the left, the pawl 50 rotates the ratchet 53, and with it the counter dial 13, a distance corresponding to one unit on the scale. When the operating member is released, it returns to its starting position under the influence of spring 41, as described previously. At the same time the counter-actuating slide 21 is also restored to its original position by the action of spring 47.

Figure 5:
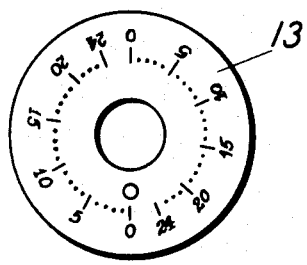
Figures 5 and 6 are views of two indicating dials for use with said counter mechanism.

Since the counter-actuating slide 21 is engaged by the operating member 11 only at the end of the latter's stroke, and since said slide is therefore moved a fixed distance at each stroke, regardless of the starting position of operating member 11, it is possible to adapt my novel winding and counter mechanism for feeding a different amount of film per stroke, without fundamental changes in the mechanism itself. As shown in Figure 5, the counter dial 13 is provided with two scales, each starting at zero and running up to any desired number of exposures, in this case 24. This dial, in cooperation with the double cover plates 22, 24 and the resulting long stroke of the operating member 11, may be used for taking larger and fewer pictures on a given length of film. In the preferred form of my invention, the length of stroke is adjusted to feed two of the customary picture lengths at each stroke (with 35 mm. film of standard perforations). Twenty-four of these double frame pictures are taken on each roll of the film.

In certain cases, however, it may be desirable to provide a camera which takes single frame, rather than double frame, pictures. The present feeding and counter mechanism can be readily modified for the feeding of such single frame pictures with relatively few changes in construction. First of all, the supporting plate 15 with its slot 16 is replaced by a plate 59 (Figures 8 and 9), which is identical with plate 15 in every respect except that it is provided with a slot 60 only half as long as slot 16. The slots are identical at those portions corresponding to the end of the feeding stroke, and the new slot 60 is simply shortened at its starting end (the right hand end of Figure 8) as at 61. Since the operating member 11 thus starts its stroke from a position which would correspond approximately to the center of the previous slot 16, it is apparent that only half as much film will be fed with each stroke. It is obvious that any other desired change in the amount of film to be fed could be made by a corresponding modification of the length of slot 60.

Figure 6:
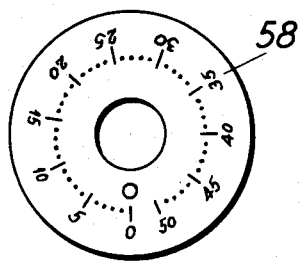

As shown in Figure 9, the same counter-actuating slide 21 and ratchet wheel 53, are suitable for use with the modified feeding mechanism. It may be desirable, however, to change the counter dial 13 and replace it by a dial 58 (Figure 6), which carries a single scale with the desired number of exposures thereon. In the present case, the dial is indexed from zero to 50 to correspond with the previous dial 13, which had two scales each running to 24. Thus, dial 58 is adapted for indicating the number of single frame exposures or feeding movements in the modified form of construction.

Obviously it would be unnecessary to change the light-excluding cover plates 22 and 24 since they would be equally effective for the shorter stroke limited by slot 60. If desired, however, it would be possible to replace the double plate arrangement by the single cover plate 62 shown in Figure 10. The single plate would be adequate in this modified construction since the feeding stroke for single frame exposures is in this case much shorter than one third of the available space for movement of said slide 62. Similarly, the bed plate 26 may, if desired, be replaced by a bed plate having a shorter slot than slot 63, in order to make said slot correspond in length to slot 60 of the supporting plate 59. Figure 8 shows the modified construction with a single cover plate 62, but with the same bed plate 26 as used in the mechanism of Figures 1 to 4.

All the other features of construction of this single frame feeding and counter mechanism are identical with the structure of Figures 1 to 4 and need not be described again. It is thus apparent that a form of construction has been provided for a combination feeding and counter mechanism which can be readily modified in order to accommodate the mechanism to the feeding of a different amount of film per stroke. This change in construction involves a replacement of a minimum number of parts, since only the limiting slot for the operating member 11, and possibly the counter dial, need to be changed. This change in the counter dial is optional, since it is apparent that the completely numbered dial of Figure 6 could be used either for single or double frame movements. The double scale dial 13 of Figure 5 is, however, of somewhat greater convenience for the double frame exposures, since there are two starting or zero positions to which the dial may originally be set. The original setting to the zero position is accomplished by rotation of the knurled knob 14, counter dial, and ratchet wheel 53, in a clockwise direction with reference to Figures 4 and 9. This clockwise movement is permitted by pawl 50 which is pivoted out of the way against the action of spring 52 during such movement.

Since many equivalent forms of construction will be readily apparent to those persons skilled in the art, and since such equivalent constructions will have the essential features and advantages of the mechanism described herein, it should be understood that the present invention is not limited in scope to the specific devices shown in the drawings, but should be interpreted broadly in the light of the disclosure and limited only by the spirit of the appended claims.

Now therefore I claim:

1. A film shifting mechanism for a rollfilm camera including a camera back attached to said camera and provided with an opening, a replaceable supporting plate removably fastened to said back across said opening and having a longitudinal slot which coincides with at least a portion of said back opening, a reciprocating slide mounted inside said camera back and carrying an operating member projecting through said supporting plate slot, the length of said slot limiting the movement of said operating member, means on said slide for engaging and feeding said film upon movement in one direction.

2. A film shifting mechanism for a rollfilm camera including a camera back attached to said camera and provided with an opening, a replaceable supporting plate removably fastened to said back across said opening and having a longitudinal slot which coincides with at least a portion of said back opening, a reciprocating slide mounted inside said camera back and carrying an operating member projecting through said supporting plate slot, the length of said slot limiting the movement of said operating member, means on said slide for engaging and feeding said film upon movement in one direction, a counter-actuating member engaged and operated by said slide at the end of its film-feeding movement independent of the length of stroke of the reciprocating slide, a numbered counter dial operated by said counter-actuating member for registering the number of feeding movements.

LEW W. LESSLER.